J. F. SCHILLER.
PISTON VALVE.
APPLICATION FILED FEB. 14, 1911.
996,680.
Patented July 4, 1911.
2 SHEETS—SHEET 2.
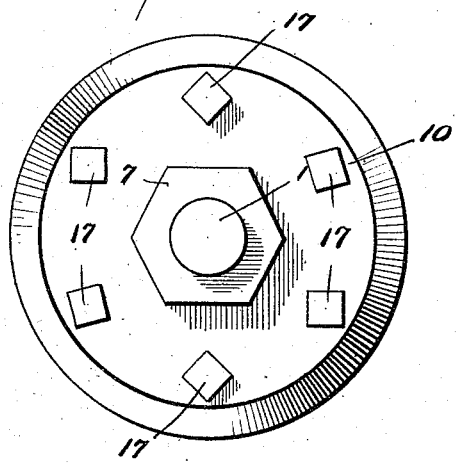
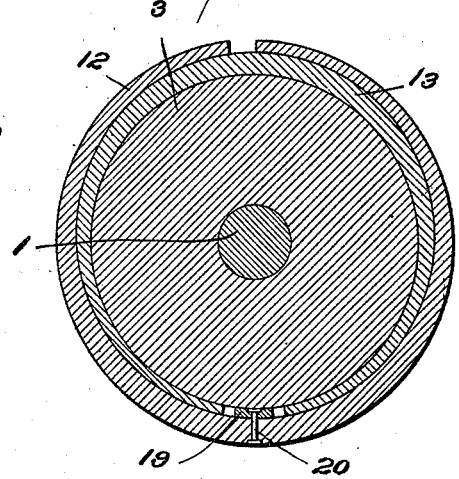
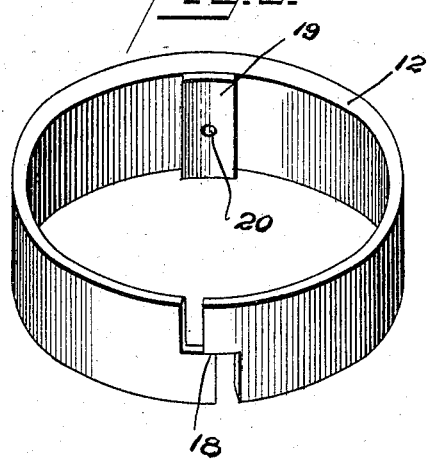
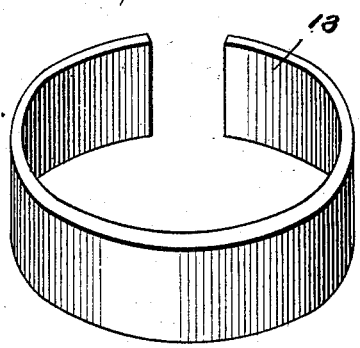
Witnesses
H. Strauss
R. H. Krenkel
Inventor
Joseph F. Schiller
By Joshua R. H. Potts
Attorney

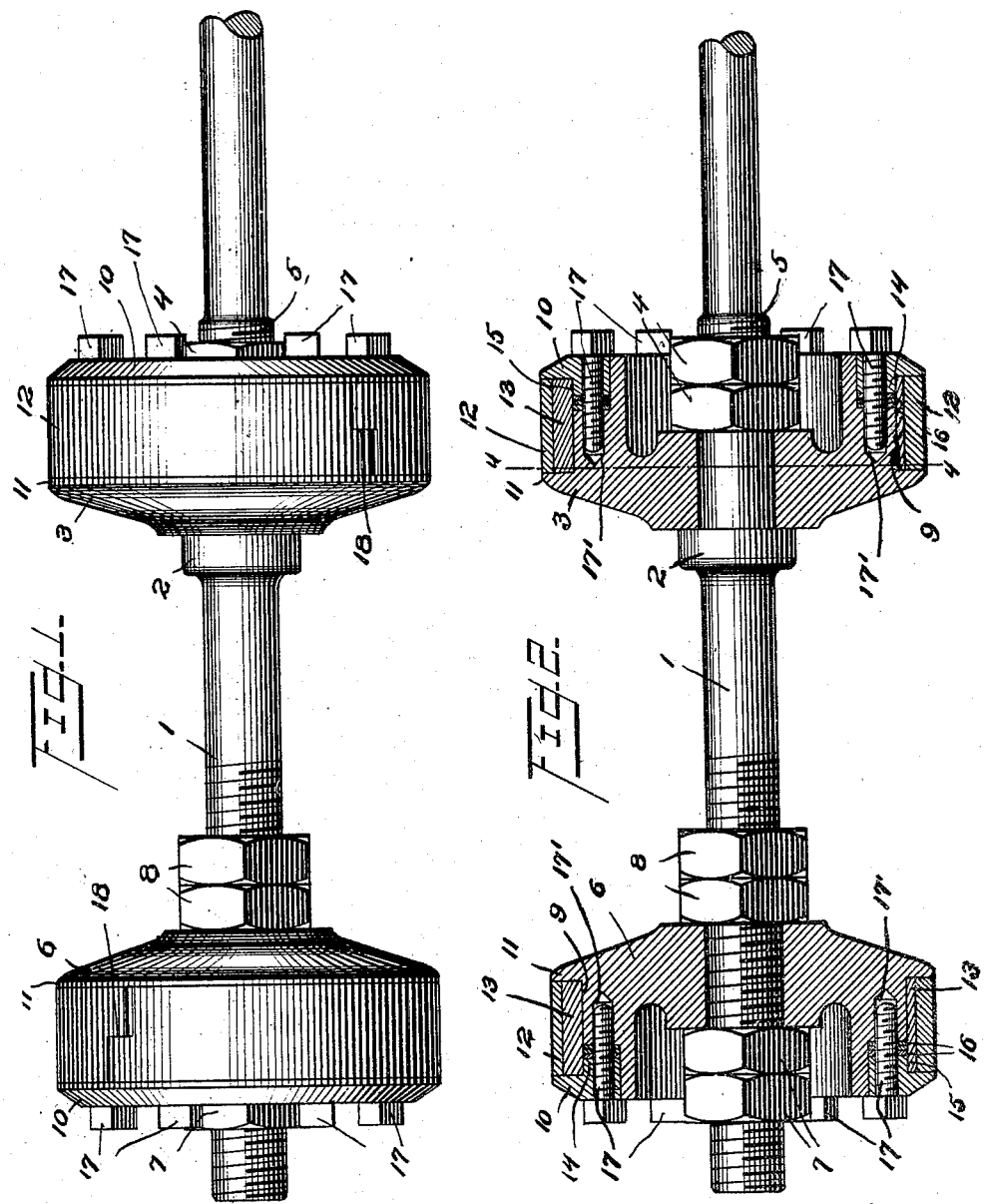

UNITED STATES PATENT OFFICE.

JOSEPH F. SCHILLER, OF PHILADELPHIA, PENNSYLVANIA.

PISTON-VALVE.

996,680.

Specification of Letters Patent. Patented July 4, 1911.

Application filed February 14, 1911. Serial No. 608,642.

*To all whom it may concern:*

Be it known that I, JOSEPH F. SCHILLER, a citizen of the United States, residing at Philadelphia, in the county of Philadelphia and State of Pennsylvania, have invented certain new and useful Improvements in Piston-Valves, of which the following is a specification.

My invention relates to improvements in piston valves, more particularly to improved packing for the valves, the object of the invention being to provide improved mounting for the members of the piston valve, which enable a fine adjustment to insure a perfect cut off of the steam when the device is used as a steam valve, but it is not limited to that particular use, as it may be used for water or other fluid.

A further object is to provide an improved construction of double eccentric rings oppositely disposed one within the other, and provide improved means preventing independent movement of either ring.

With these and other objects in view, the invention consists in certain novel features of construction and combinations and arrangements of parts, as will be more fully hereinafter described and pointed out in the claim.

In the accompanying drawings: Figure 1, is a view in side elevation illustrating my improvements. Fig. 2, is a view in longitudinal section. Fig. 3, is an end view. Fig. 4, is a view in section on the line 4—4 of Fig. 2, and Figs. 5, and 6, are perspective views of the packing rings.

1, represents a rod having an integral shoulder 2 thereon, against which one head 3 of my improved piston valve is secured by means of nuts 4 screwed on to a threaded portion 5 of said rod. This head 3 therefore has a fixed relation to the rod. The other head 6, however, of the piston valve, is secured between nuts 7 and 8, so that it may be adjusted longitudinally of the rod, and insure the proper positioning of the heads 3 and 6, so as to properly cut off the ports.

Both of the heads 3 and 6 are provided in the outer faces with annular grooves 9, and rings 10 coöperate with flanges 11, constituting walls of said grooves, to confine between them, my improved packing rings 12 and 13. The rings 10 are made with circular flanges 14 which project into recesses 15, and between the rings 10 and the inner walls of the recesses 15, rings or washers 16 are interposed. Screws 17 extend through the rings 10, and washers 16, and are screwed into threaded sockets 17' in the heads 3 and 6 to clamp the rings 10 and confine the packing rings 12 and 13. The packing rings 12 and 13 are each eccentric, in other words, they are thickest at their intermediate portions and taper toward their ends. Both rings are split, the meeting ends of rings 12 having a lap joint as shown at 18, and a section 19 is cut from the thinnest portion of ring 13, and is secured by a rivet 20 to the inner face of ring 12 at the thickest portion of the latter, so that when the rings are assembled, ring 13 within ring 12 as shown in Fig. 4, the section 19 prevents any independent rotary movement of either ring, which would tend to jam. Both rings are however, permitted free expansion, and maintain a circular exterior concentric with the valve which is maintained in tight engagement with the casing (not shown). The double eccentric rings form circles interiorly and exteriorly, they expand equally in all directions, they center the piston valve in the cylinder, and they form a perfectly steam tight juncture with the casing, the lap joint 18 preventing any passage of the steam through the rings.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A packing comprising an inner and an outer ring, said rings both eccentric, thickest at their intermediate portions and tapering to their ends, a plate secured to the inner face of the outer ring at its thicker portion, and located between the ends of the inner ring, said plate constituting a section cut from the thinnest portion of said inner ring and said outer ring cut at its thinner portion forming a lap joint, substantially as described.

In testimony whereof I have signed my name to this specification in the presence of two subscribing witnesses.

JOSEPH F. SCHILLER.

Witnesses:
R. H. KRENKEL,
CHARLES E. POTTS.